United States Patent
Crum et al.

(10) Patent No.: US 9,581,276 B2
(45) Date of Patent: Feb. 28, 2017

(54) LOADING ARM COUNTERBALANCE ADJUSTMENT MECHANISM

(71) Applicant: OPW-Engineered Systems, Inc., Lebanon, OH (US)

(72) Inventors: Michael Crum, Dayton, OH (US); Krzysztof Wejdman, Zielonki (PL)

(73) Assignee: OPW-ENGINEERED SYSTEMS, INC., Lebanon, OH (US)

( * ) Notice: Subject to any disclaimer, the term of this patent is extended or adjusted under 35 U.S.C. 154(b) by 850 days.

(21) Appl. No.: 13/922,094

(22) Filed: Jun. 19, 2013

(65) Prior Publication Data
US 2013/0341908 A1 Dec. 26, 2013

Related U.S. Application Data

(60) Provisional application No. 61/663,994, filed on Jun. 25, 2012.

(51) Int. Cl.
*F16L 27/08* (2006.01)
*F16L 55/00* (2006.01)
*F16L 43/02* (2006.01)

(52) U.S. Cl.
CPC .............. *F16L 55/00* (2013.01); *F16L 27/08* (2013.01); *F16L 27/0845* (2013.01);
(Continued)

(58) Field of Classification Search
CPC ... F16L 3/20; F16L 3/202; F16L 43/02; F16L 27/0861; F16L 27/023; F16L 27/0824; F16L 27/0828; B67D 9/02; F16K 31/58
(Continued)

(56) References Cited

U.S. PATENT DOCUMENTS 896,995 A * 8/1908 Kates ...................... F16K 31/58
137/616.7
2,727,534 A * 12/1955 Briede ................ F16L 27/0861
137/615
(Continued)

FOREIGN PATENT DOCUMENTS

WO 2014004389 1/2014

OTHER PUBLICATIONS

International Search Report and Written Opinion for PCT/US2013/047364 mailed Nov. 25, 2013.

*Primary Examiner* — David E Bochna
(74) *Attorney, Agent, or Firm* — Workman Nydegger

(57) ABSTRACT

A fluid system includes a loading arm connected to a swivel joint. A counterbalance mechanism is connected between the loading arm and the swivel joint. An adjustment mechanism adjusts the counterbalance force applied by the counterbalance mechanism to the loading arm. The adjustment mechanism includes a guide plate connected to the swivel joint and includes a guide slot and a straight bore guide. A bracket is movably connected to the guide plate and has one or more apertures and a threaded bore guide. Fasteners extend through the guide slot and the one or more apertures to selectively secure the bracket to the guide plate. A lead screw is disposed at least partially within the straight bore guide and the threaded bore guide. Rotation of the lead screw causes the bracket to move along a length of the lead screw and thereby adjust the counterbalance force.

17 Claims, 4 Drawing Sheets

(52) U.S. Cl.
CPC ............... *F16L 43/02* (2013.01); *Y10T 16/82* (2015.01); *Y10T 16/84* (2015.01)

(58) Field of Classification Search
USPC .................................................. 285/273, 282
See application file for complete search history.

(56) References Cited

U.S. PATENT DOCUMENTS

| | | | |
|---|---|---|---|
| 2,781,052 A * | 2/1957 | Schaetzly | F16L 27/0861 137/236.1 |
| 3,073,343 A | 1/1963 | Mowell et al. | |
| 3,086,552 A | 4/1963 | Ragsdale | |
| 3,126,913 A * | 3/1964 | Green et al. | F16L 27/0861 137/356 |
| 3,221,772 A * | 12/1965 | Arntzen | B67D 9/02 137/615 |
| 3,319,935 A * | 5/1967 | Eitel | B66F 11/046 254/134.3 R |
| 3,340,912 A * | 9/1967 | Williams | A01G 23/091 144/24.13 |
| 3,378,033 A * | 4/1968 | Cooley, Jr. | B67D 7/002 137/615 |
| 3,455,333 A | 7/1969 | Bily | |
| 3,458,167 A * | 7/1969 | Cooley, Jr. | B67D 9/02 137/615 |
| 3,489,174 A * | 1/1970 | Cooley, Jr. | F16L 27/0861 137/615 |
| 3,651,832 A | 3/1972 | Meyer | |
| 3,786,837 A * | 1/1974 | Pipkins | F16L 27/0861 137/625.3 |
| 4,269,239 A * | 5/1981 | Haley | B67D 9/02 137/615 |
| 4,512,665 A * | 4/1985 | Cline | B01F 5/02 285/282 |
| 4,987,925 A * | 1/1991 | Vroonland | B67D 9/02 137/615 |
| 6,732,770 B1 * | 5/2004 | Nusbaumer | B61K 11/00 137/615 |
| 2014/0060685 A1 * | 3/2014 | Roth | F16L 3/202 137/615 |

* cited by examiner

LOADING ARM COUNTERBALANCE ADJUSTMENT MECHANISM

CROSS REFERENCE TO RELATED APPLICATIONS

This application claims priority to and the benefit of U.S. Provisional Patent Application Ser. No. 61/663,994, filed Jun. 25, 2012, entitled "LOADING ARM COUNTERBALANCE ADJUSTMENT MECHANISM," the disclosure of which is incorporated herein by this reference.

BACKGROUND

1. Technical Field

Exemplary embodiments of the invention relate to fluid systems. More particularly, exemplary embodiments of the invention relate to a counterbalance adjustment mechanism for adjusting the counterbalancing force applied to a loading arm by a counterbalance mechanism.

2. The Relevant Technology

In many fluid systems, fluids are transferred from one reservoir to another. For instance, in the oil and gas industry, fluids are transferred from storage tanks to transport vehicles (e.g., tank trucks, railroad cars, ships, etc.) so that the fluids may be transported to various destinations. To transfer the fluid from the storage tank to the transport vehicles, the fluids are pumped through a loading arm.

A first end of the loading arm is connected to a riser or stand pipe. The stand pipe is in fluid communication with the storage tank so that the fluid in the storage tank may be pumped from the storage tank and into the loading arm. The stand pipe typically provides a strong platform upon which the loading arm can be mounted.

To facilitate connection of a second end of the loading arm to the transport vehicle, the first end of the loading arm may be connected to the stand pipe with one or more swivel joints. The swivel joints may allow the loading arm to rotate in one or more directions (e.g., about one or more axes of rotation) so that the loading arm may be repositioned to enable the second end of the loading arm to be connected to the transport vehicle.

Due to the weight of the loading arm and the fluids pumped therethrough, mechanisms have been developed to counterbalance the rotational forces resulting from this weight. Counterbalancing the rotational forces reduces the level of effort required of an operator to manipulate the loading arm and increases the safety of these systems. Such counterbalancing mechanisms have included external counterbalancing weights, hydraulic cylinders, spring and lever arm assemblies, pulley and cable systems, and the like. In other cases, internal counterbalancing mechanisms have been used, such as torsion springs disposed with the swivel joints.

For various reasons, such as the fittings used on the loading arm and the weight of the fluids pumped through the loading arm, the counterbalancing force applied to the loading arm by a counterbalance mechanism may need to be adjusted from time to time. Some of the previous counterbalance mechanisms included adjustment mechanisms for adjusting the counterbalancing force. These adjustment mechanisms, however, suffer from a number of limitations. For instance, previous adjustment mechanisms have been difficult to adjust, often requiring the attention of multiple people. Some of the adjustment mechanisms require disassembling the adjustment mechanism from the fluid system so the adjustment mechanism can be taken to a shop to be adjusted. Still further, previous adjustment mechanisms have been difficult to precisely adjust. Moreover, adjusting some of the previous adjustment mechanisms can pose a safety risk to the personnel performing the adjustment.

Accordingly, what is desired is an adjustment mechanism that can simply, easily, and safely adjust the counterbalancing force applied to a loading arm and any fluid therein.

BRIEF SUMMARY

Exemplary embodiments of the invention relate to an adjustment mechanism which can readily and safely adjust the counterbalancing force applied to a loading arm and any fluid therein. For example, in one embodiment, a fluid system includes a loading arm, a swivel joint, a counterbalancing mechanism, and an adjustment mechanism. The swivel joint is configured to couple the loading arm to a fluid source and allow fluid communication between the fluid source and the loading arm. The swivel joint also enables movement of the loading arm about one or more axes of rotation. The counterbalancing mechanism is connected between the loading arm and the swivel joint. The counterbalancing mechanism has a first end and a second end and is configured to apply a counterbalancing force to oppose displacement of the loading arm. The adjustment mechanism is adapted to selectively adjust a position of the counterbalance mechanism relative to the loading arm, whereby the counterbalancing force applied by the counterbalancing mechanism is selectively adjusted.

In another exemplary embodiment, a fluid system includes a loading arm connected to a swivel joint. A counterbalance mechanism is connected between the loading arm and the swivel joint. An adjustment mechanism adjusts the counterbalance force applied by the counterbalance mechanism to the loading arm. The adjustment mechanism comprises a guide plate, a bracket, fasteners, and a lead screw. The guide plate is connected to the swivel joint and includes a guide slot and a straight bore guide. The bracket is movably connected to the guide plate and has one or more apertures and a threaded bore guide. The fasteners extend through the guide slot and the one or more apertures to selectively secure the bracket to the guide plate. The lead screw is disposed at least partially within the straight bore guide and the threaded bore guide. Rotation of the lead screw about a longitudinal axis causes the bracket to move along a length of the lead screw and thereby adjust the counterbalance force.

In still another exemplary embodiment, an adjustable counterbalancing device for counterbalancing a loading arm is provided. The adjustable counterbalancing device includes a counterbalancing mechanism having a first end and a second end. The first end is configured to pivotally connect to a loading arm. The counterbalance mechanism is also configured to apply a counterbalance force to the loading arm to counterbalance the weight of the loading arm and a fluid therein. The device also includes an adjustment mechanism configured to be connected between the second end of the counterbalancing mechanism and a swivel joint. The adjustment mechanism is adapted to selectively adjust the counterbalance force applied to the loading arm. The adjustment mechanism includes a bracket connected to the second end of the counterbalancing mechanism. The adjustment mechanism also includes a lead screw operatively associated with the bracket, the lead screw being configured to cause the bracket to translate upon rotation of the lead screw, thereby adjusting the counterbalance force applied to the loading arm. The adjustment mechanism further includes one or more fasteners configured to selectively secure the bracket in place.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope, nor are the drawings necessarily drawn to scale. The invention will be described and explained with additional specificity and detail through the use of the accompanying drawings in which.

DETAILED DESCRIPTION

Exemplary embodiments of the invention relate to an adjustment mechanism which can readily and safely adjust the counterbalancing force applied to a loading arm and any fluid therein. For example, in one embodiment, a fluid system includes a loading arm connected to a swivel joint. A counterbalance mechanism is connected between the loading arm and the swivel joint. An adjustment mechanism adjusts the counterbalance force applied by the counterbalance mechanism to the loading arm. The adjustment mechanism comprises a guide plate, a bracket, fasteners, and a lead screw. The guide plate is connected to the swivel joint and includes a guide slot and a straight bore guide. The bracket is movably connected to the guide plate and has one or more apertures and a threaded bore guide. The fasteners extend through the guide slot and the one or more apertures to selectively secure the bracket to the guide plate. The lead screw is disposed at least partially within the straight bore guide and the threaded bore guide. Rotation of the lead screw about a longitudinal axis causes the bracket to move along a length of the lead screw and thereby adjust the counterbalance force.

Reference will now be made to the drawings to describe various aspects of exemplary embodiments of the invention. It is understood that the drawings are diagrammatic and schematic representations of such exemplary embodiments, and are not limiting of the present invention, nor are they necessarily drawn to scale. No inference should therefore be drawn from the drawings as to the dimensions of any invention or element. In the following description, numerous specific details are set forth in order to provide a thorough understanding of the present invention. It will be obvious, however, to one of ordinary skill in the art that the present invention may be practiced without these specific details.

Figure 1:
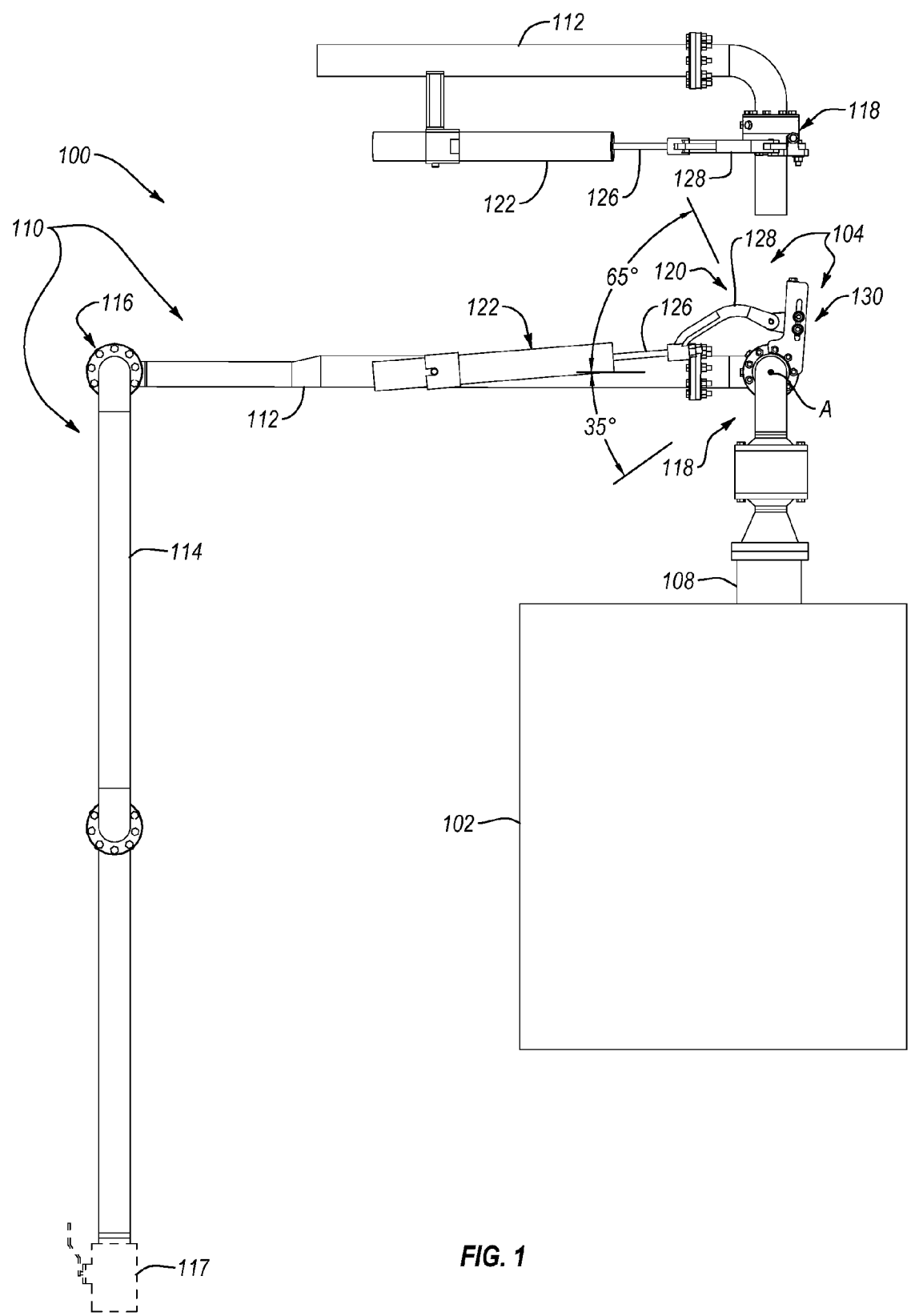
FIG. 1 depicts an exemplary fluid system for at least some embodiments of the present invention.
Figure 2A:
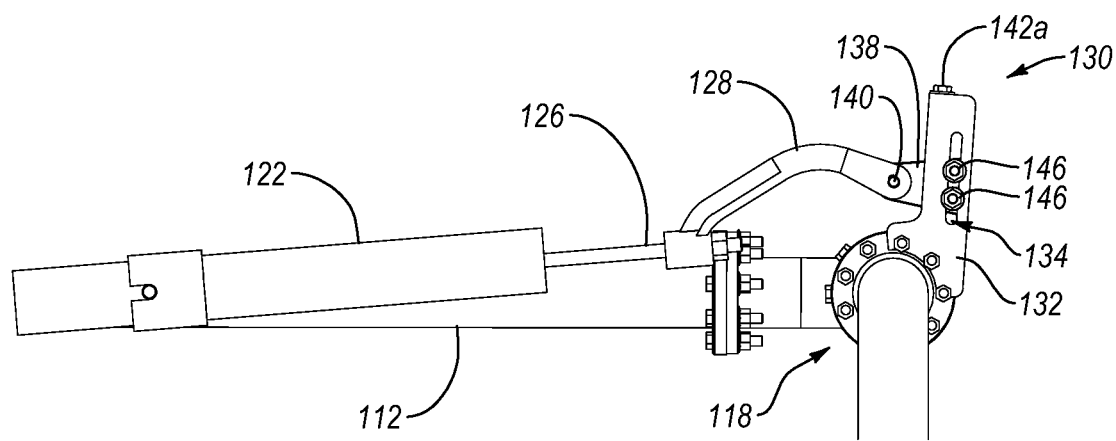
FIG. 2A illustrates a first side elevation view of a counterbalance mechanism of the fluid system of FIG. 1.
Figure 2B:
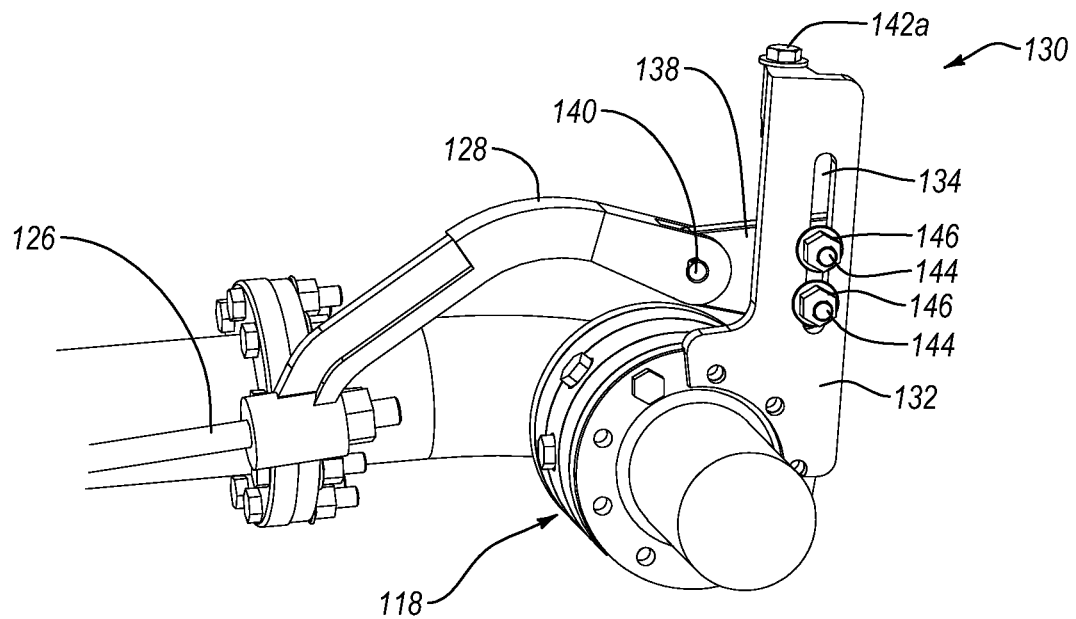
FIG. 2B illustrates a first perspective view of an adjustment mechanism for adjusting the counterbalancing force provided by the counterbalance mechanism of FIG. 2A.
Figure 3A:
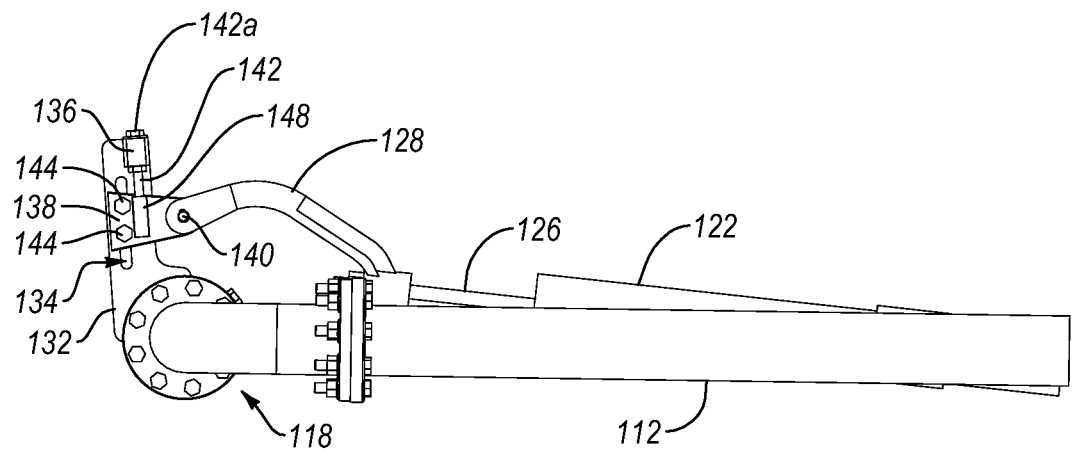
FIG. 3A illustrates a second side elevation view of the counterbalance mechanism of FIG. 2A.
Figure 3B:
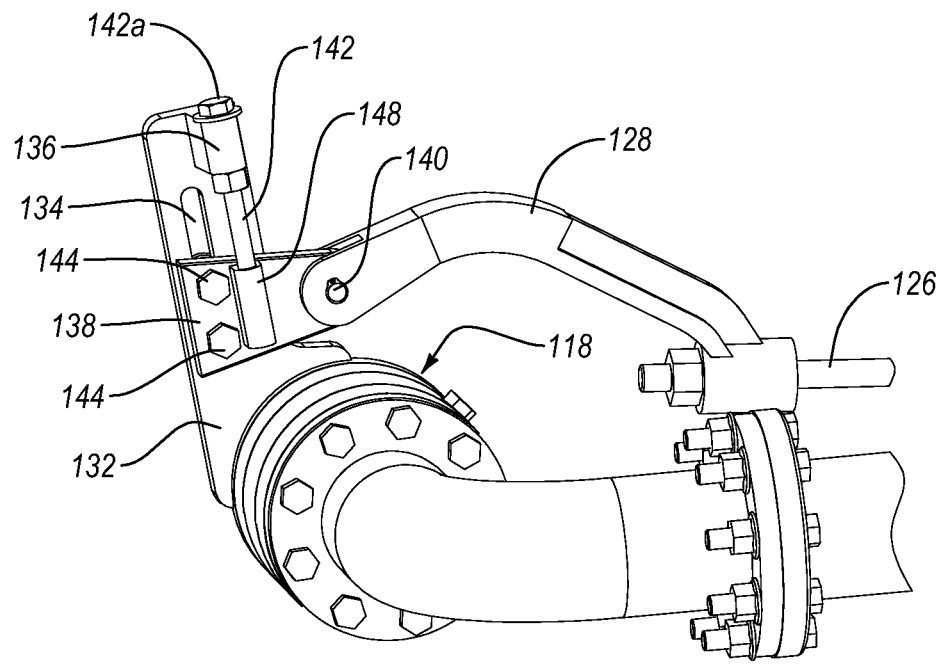
FIG. 3B illustrates a second perspective view of the adjustment mechanism of FIG. 2B.

With reference first to FIG. 1, one exemplary embodiment of a fluid system is indicated generally at 100. As used herein, "fluid" is not limited to liquids, but can include a variety of other compositions. For example, the term "fluid," as used herein, may include liquids, gases, liquid-gas combinations, slurries, liquid-solid combinations, gas-solid combinations, and liquid-solid-gas combinations.

In the exemplary embodiment depicted in FIG. 1, fluid system 100 includes a fluid source 102 and a fluid transfer system 104. In the illustrated embodiment, fluid transfer system 104 is in fluid communication with fluid source 102 such that fluid in fluid source 102 may be selectively pumped through fluid transfer system 104. Fluid transfer system 104 may be selectively connected to an inlet on a fluid destination (e.g., stationary or mobile fluid reservoir, fluid conduit, etc.) so that fluid from fluid source 102 may be delivered to the fluid destination.

Fluid source 102 may take any one of a number of configurations. For instance, fluid source 102 may include manmade storage tanks or reservoirs (e.g., above ground tanks, below ground tanks, stationary tanks, moveable tanks, etc.). Fluid source 102 may also include natural fluid reservoirs (e.g., lakes, oceans, underground gas or oil deposits, etc.). As shown in FIG. 1, fluid source 102 may also include a riser or stand pipe 108 in fluid communication with the fluid in fluid source 102. The fluid in fluid source 102 may be pumped out of fluid source 102 through stand pipe 108. Stand pipe 108 may be stably secured in place and may be strong enough to support fluid transfer system 104, which is mounted on stand pipe 108 as shown in FIG. 1.

In the illustrated embodiment, fluid transfer system 104 includes a loading arm 110 having an inboard loading arm 112 and an outboard loading arm 114 that are connected together with a swivel joint 116 to allow outboard loading arm 114 to move relative to inboard loading arm 112. As shown in FIG. 1, outboard loading arm 114 may include a fitting or coupling 117 at an end thereof that can be selectively coupled to an inlet on a fluid destination.

In the illustrated embodiment, loading arm 110 is connected to stand pipe 108 via swivel joint 118. Although only one swivel joint 118 is shown connecting loading arm 110 and stand pipe 108, it will be understood that one or more swivel joints 118 may be used to connect loading arm 110 and stand pipe 108. The one or more swivel joints 118 may allow for loading arm 110 to rotate about one or more axes. In the illustrated embodiment, for instance, swivel joint 118 enables loading arm 110 to rotate about axis A so that outboard loading arm 114 can be raised and lowered.

Connected between inboard loading arm 112 and swivel joint 118 is a counterbalance mechanism 120. Counterbalance mechanism 120 counterbalances the weight of loading arm 110 and any fluid therein, thereby enabling loading arm 110 to be raised and lowered without requiring excessive force while also preventing loading arm 110 from moving up or down in a rapid and/or unsafe manner.

In one embodiment, counterbalance mechanism 120 may include a linear spring canister 122 connected to inboard loading arm 112. While not shown, linear spring canister 122 has a linear spring 124 disposed therein. Operatively connected to one end of linear spring 124 is a rod 126. Rod 126 is movable relative to linear spring canister 122. As rod moves relative to linear spring canister 122, linear spring 124 is stretched or compressed. One will appreciate that in additional or alternative embodiments, counterbalance mechanism 120 may include (in addition or as an alternative to linear spring 124) a hydraulic, pneumatic, or electromagnetic piston and cylinder that applies a resistive force opposing displacement of one or both ends of the piston. In yet another embodiment, counterbalance mechanism 120 may include a dashpot to retard sudden movements of loading arm 110.

In the illustrated embodiment, rod 126 extends out of linear spring canister 122 and is connected to an arm 128, which is pivotally connected to an adjustment mechanism 130 mounted on swivel joint 118. As inboard loading arm 112 moves up and down (e.g., rotates about axis A) rod 126 moves, respectively, further into and out of linear spring canister 122, thereby stretching or compressing linear spring 124. As linear spring 124 is stretched and compressed, the counterbalancing force applied to loading arm 110 increases and decreases.

The degree to which the counterbalancing force increases or decreases is a result of how much linear spring 124 is stretched or compressed. Accordingly, to increase or decrease how much linear spring 124 is stretched or compressed, the extent to which rod 126 moves into and out of linear spring canister 122 may be adjusted. For instance, if inboard loading arm 112 is held in the position shown in FIG. 1 and rod 126 is moved further into linear spring canister 122, then rod 126 would move further into and not as far out of linear canister 122 as inboard loading arm 112 moves up and down. As a result, linear spring 124 would be compressed or stretched to a greater or lesser extent, thereby increasing or decreasing the counterbalancing force applied to loading arm 110.

In order to facilitate such adjustments of the counterbalancing force, counterbalance mechanism 120 includes adjustment mechanism 130. In discussing adjustment mechanism 130, attention is directed to FIG. 1 as well as FIGS. 2A-3B.

As noted, adjustment mechanism 130 is mounted on swivel joint 118. More specifically, adjustment mechanism 130 includes a guide plate 132 connected to swivel joint 118 such that guide plate 132 remains in a generally stationary position even when loading arm 110 is moving. Guide plate 132 includes a guide slot 134 and a guide 136, which will be discussed in greater detail below.

Movably connected to guide plate 132 is a bracket 138. As will be discussed below, bracket 138 is movable relative to guide plate 132 in a direction that is generally parallel to guide slot 134. Bracket 138 is also movably connected to arm 128 at pivot 140. Pivot 140 enables arm 128 (and by extension, rod 126, linear spring 126, and linear spring canister 124) to pivot or rotate relative to bracket 138.

Bracket 138 is movably connected to guide plate 132 by a lead screw 142 and one or more fasteners, such as bolts 144 and nuts 146. More specifically, bolts 144 pass through apertures in bracket 138 and through guide slot 134 and nuts 146 are used to secure bolts 144 in place. When nuts 146 are tightened, bracket 138 is held in place relative to guide plate 132. In contrast, when nuts 146 are loosened, bracket 138 may be moved relative to guide plate 132. When bracket 138 moves relative to guide plate 132, bolts 144 slide through guide slot 134.

In the illustrated embodiment, bracket 138 is also movably connected to guide plate 132 by lead screw 142. Lead screw 142 is received within guide 136 on guide plate 132. Guide 136 has a straight bore extending therethrough in which a portion of lead screw 142 is positioned. The straight bore enables lead screw 142 to freely rotate within guide 136 about a longitudinal axis of lead screw 142. One or more retaining devices, such as bolts, may be used to prevent lead screw 142 from moving translationally relative to guide 136 when lead screw 142 is rotated.

Similar to guide plate 132, bracket 138 includes a guide 148 with a bore extending therethrough for receiving lead screw 142 therein. Unlike the straight bore in guide 136, however, the bore in guide 148 is threaded. As a result, rotation of lead screw 142 causes guide 148 (and the rest of bracket 138) to move translationally along at least a portion of the length of lead screw 142.

Accordingly, in operation, the position of bracket 138 may be adjusted as follows. Nuts 146 are loosened so as to reduce the friction between guide plate 132 and bracket 138. With nuts 146 loosened and the friction reduced, lead screw 142 is rotated about its axis. The rotation of lead screw 142 causes bracket 138 to move translationally along the length of lead screw 142 and in a direction that is generally parallel to the length of guide slot 134. The direction of rotation of lead screw 142 determines the direction that bracket 138 will move. As bracket 138 moves, bolts 144 slide through guide slot 134. Once bracket 138 is moved to the desired position, nuts 146 are tightened to increase the friction between guide plate 132 and bracket 138 and thereby hold bracket 138 is place relative to guide plate 132.

Repositioning of bracket 138 results in increases or decreases in the counterbalancing force provided by counterbalance mechanism 120. As bracket 138 is moved, the position of rod 126 relative to linear spring 124/linear spring canister 122 is changed (e.g., rod 126 is moved further into or out of linear spring canister 122). Additionally, the angle between inboard loading arm 112 and linear spring 124/linear spring canister 122 also changes.

Figure 4A:
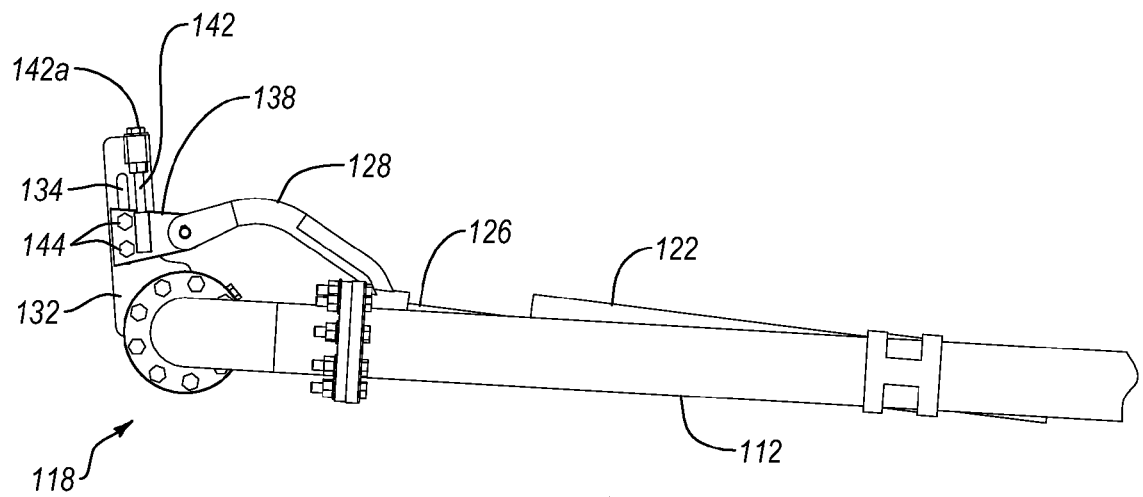
FIG. 4A depicts a loading arm with a counterbalance adjustment mechanism in a first position to provide a first level of counterbalancing force to the loading arm.
Figure 4B:
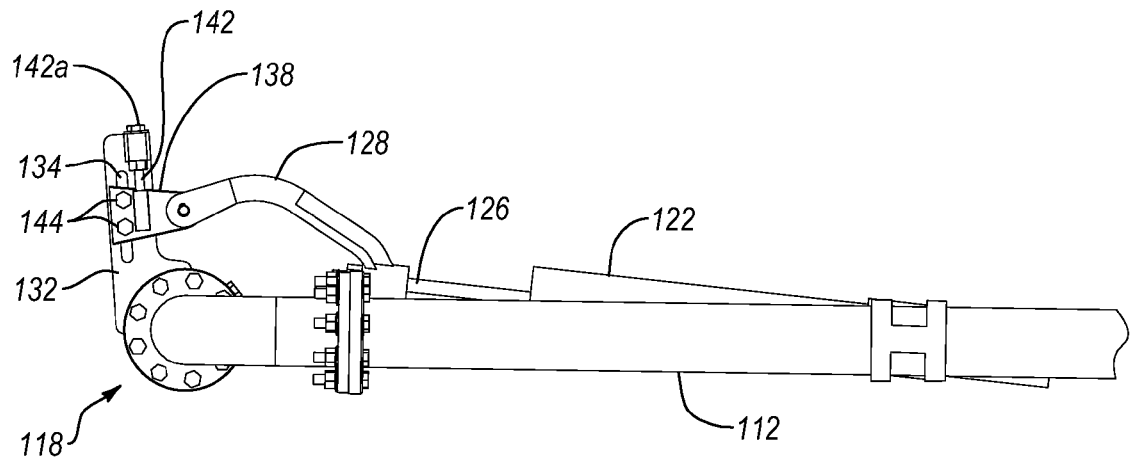
FIG. 4B depicts the loading arm of FIG. 4A with the counterbalance adjustment mechanism in a second position to provide a second level of counterbalancing force to the loading arm.
Figure 4C:
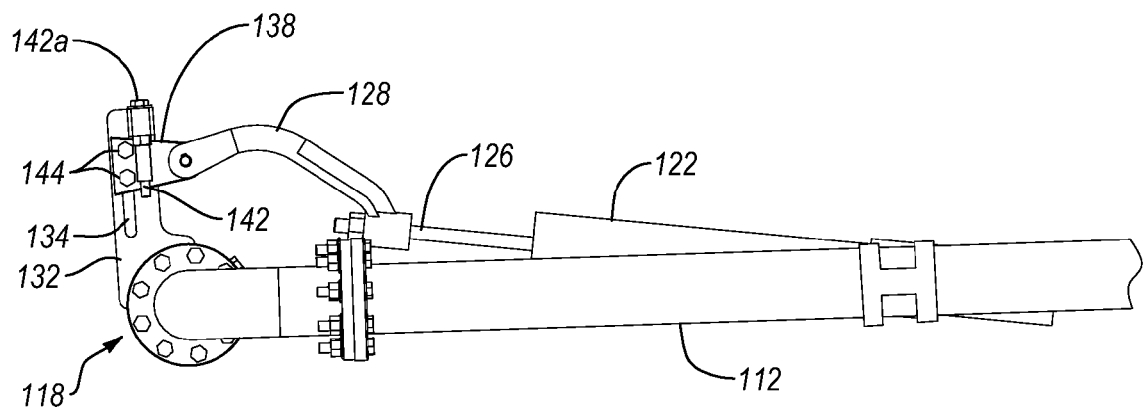
FIG. 4C depicts the loading arm of FIG. 4A with the counterbalance adjustment mechanism in a third position to provide a third level of counterbalancing force to the loading arm.

FIGS. 4A-4C shown bracket 138 in three different positions, which result in three different counterbalancing forces being applied to counterbalance mechanism 120. In FIG. 4A, bracket 138 is shown in a lowest position. In this position, bolts 144 are near the lower end of guide slot 134 and rod 126 extends into linear spring canister 122 a certain distance. In FIG. 4B, bracket 138 is shown in an intermediate position such that bolts 144 are positioned near the middle of guide slot 134. In FIG. 4B, open portions of guide slot 134 can be seen both above and below bracket 138. When bracket 138 is moved from the lowest position shown in FIG. 4A to the intermediate position shown in FIG. 4B, rod 126 is pulled further out of linear spring canister 122. In FIG. 4C, bracket 138 is shown in a highest position. In the highest position, bolts 144 are near the higher end of guide slot 134 and rod 126 extends even further out of linear spring canister 122. As mentioned below, these positions are merely exemplary.

Depending on the arrangement of linear spring 124 and how/where rod 126 is connected thereto, moving rod 126 further out of or into linear spring canister 122 can increase or decrease the counterbalancing force. In one embodiment, for instance, pulling rod 126 further out of linear spring canister 122 increases the counterbalancing force. Thus, when bracket 138 is positioned as shown in FIG. 4A, counterbalance mechanism 120 provides a lowest counterbalancing force. When bracket 138 is moved to the positions shown in FIGS. 4B and 4C, counterbalance mechanism 120 provides an intermediate and highest counterbalancing force, respectively.

Using both bolts 144/nuts 146 and lead screw 142 to connect bracket 138 to guide plate 132 provides various advantages. For instance, when nuts 146 are loosened to enable movement of bracket 138, lead screw 142 and guide bracket 148 cooperate to prevent sudden and potentially dangerous movement of loading arm 110. More specifically, when nuts 146 are loosened, lead screw 142 and guide bracket 148 cooperate to prevent bolts 144 from rapidly sliding through guide slot 134. If bolts 144 were allowed to rapidly move in this way, the counterbalancing force may rapidly change. A rapid change in the counterbalancing force may allow loading arm 110 to quickly rise or drop, which could result in injury or damage.

Using lead screw 142 allows for bracket 138 to be moved to an almost infinite number of positions relative to guide plate 132, thereby allowing for almost infinite variations in the counterbalancing force. In other words, rather than connecting bracket 138 to guide plate 132 at various discrete locations that result in discrete counterbalancing forces, bracket 138 can be moved to substantially any position along guide slot 134 to provide substantially any desired counterbalancing force.

Furthermore, once bracket 138 has been moved to the desired position via lead screw 142, nuts 146 can be tightened on bolts 144 so that the load of loading arm 110 is at least partially removed from lead screw 142 and is borne primarily by bolts 144. Removing all or part of the load from lead screw 142 can prolong the life of lead screw 142.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid system, comprising:
   a loading arm;
   a swivel joint connectable between the loading arm and a standpipe associated with a fluid source to allow fluid communication between the fluid source and the loading arm, wherein the swivel joint enables movement of the loading arm about one or more axes of rotation;
   a counterbalancing mechanism connected between the loading arm and the swivel joint, the counterbalancing mechanism having a first end and a second end and being configured to apply a counterbalancing force to oppose displacement of the loading arm, wherein the counterbalancing mechanism comprises a linear spring; and
   an adjustment mechanism adapted to selectively adjust a position of the counterbalance mechanism relative to the loading arm, whereby the counterbalancing force applied by the counterbalancing mechanism is selectively adjusted, wherein the adjustment mechanism comprises a guide plate connected to the swivel joint and the guide plate comprises a guide slot configured so the counterbalancing mechanism may be selectively adjusted in an infinite number of positions.

2. A fluid system as recited in claim 1, wherein the adjustment mechanism further comprises one or more fasteners configured to selectively fix the position of the second end of the counterbalancing mechanism relative to the guide plate.

3. A fluid system as recited in claim 1, wherein the adjustment mechanism comprises a lead screw.

4. A fluid system as recited in claim 1, wherein the counterbalancing mechanism further comprises a dashpot.

5. A fluid system as recited in claim 1, wherein the counterbalancing mechanism comprises a piston and cylinder.

6. A fluid system as recited in claim 1, wherein the counterbalancing mechanism comprises a connecting rod that may be selectively lengthened or shortened.

7. A fluid system, comprising:
   a loading arm adapted to have fluid pass therethrough;
   one or more swivel joints connected to the loading arm, wherein the one or more swivel joints enable movement of the loading arm about one or more axes of rotation;
   a counterbalance mechanism connected between the loading arm and the swivel joint, the counterbalance mechanism being configured to apply a counterbalance force to the loading arm to counterbalance the weight of the loading arm and fluid therein, wherein the counterbalance mechanism comprises a linear spring; and
   an adjustment mechanism that selectively adjusts the counterbalance force, the adjustment mechanism comprising:
      a guide plate connected to the one or more swivel joints, the guide plate having a guide slot and a straight bore guide;
      a bracket movably connected to the counterbalance mechanism and the guide plate, the bracket having one or more apertures and a threaded bore guide;
      one or more fasteners that extend through the guide slot and the one or more apertures to selectively secure the bracket to the guide plate; and
      a lead screw disposed at least partially within the straight bore guide and the threaded bore guide, wherein rotation of the lead screw about a longitudinal axis causes the bracket to move along a length of the lead screw.

8. A fluid system as recited in claim 7, wherein the linear spring is disposed within a canister that is connected to the loading arm.

9. A fluid system as recited in claim 8, wherein the counterbalance mechanism comprises a rod connected between the linear spring and the adjustment mechanism.

10. A fluid system as recited in claim 9, wherein movement of the bracket results in movement of the rod relative to the canister.

11. A fluid system as recited in claim 9, further comprising an arm connected to the rod.

12. A fluid system as recited in claim 11, wherein the arm is pivotally connected to the bracket.

13. A fluid system as recited in claim 7, wherein the one or more fasteners comprise one or more bolts and one or more nuts.

14. A fluid system as recited in claim 7, wherein the one or more fasteners are movably disposed within the guide slot.

15. A fluid system as recited in claim 14, wherein the one or more fasteners move within the guide slot when the lead screw is rotated.

16. An adjustable counterbalancing device for counterbalancing a moveable loading arm relative to a swivel joint, the device comprising:
- a counterbalancing mechanism having a first end and a second end, the first end being configured to pivotally connect to the loading arm, and the second end being configured to connect to the swivel joint, the counterbalance mechanism being configured to apply a counterbalance force to the loading arm to counterbalance the weight of the loading arm and a fluid therein, wherein the counterbalancing mechanism comprises a linear spring; and
- an adjustment mechanism configured to be connected between the second end of the counterbalancing mechanism and the swivel joint, the adjustment mechanism being adapted to selectively adjust the counterbalance force applied to the loading arm, the adjustment mechanism comprising:
  - a bracket connected to the second end of the counterbalancing mechanism;
  - a lead screw operatively associated with the bracket, wherein the lead screw is configured to cause the bracket to translate upon rotation of the lead screw, thereby adjusting the counterbalance force applied to the loading arm; and
  - one or more fasteners configured to selectively secure the bracket in place, wherein the adjustment mechanism comprises a guide plate connected to the swivel joint, the guide plate having a guide slot and a straight bore guide.

17. An adjustable counterbalancing device as recited in claim 16, wherein the bracket comprises one or more apertures and a threaded bore guide.

\* \* \* \* \*